US011132767B2

(12) United States Patent
Lee

(10) Patent No.: US 11,132,767 B2
(45) Date of Patent: Sep. 28, 2021

(54) VEHICULAR NAVIGATION APPARATUS, METHOD OF DISPLAYING IMAGE THEREOF, AND VEHICLE INCLUDING VEHICULAR NAVIGATION APPARATUS

(71) Applicants: Hyundai Motor Company, Seoul (KR); Kia Motors Corporation, Seoul (KR)

(72) Inventor: Kyung Soo Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/534,718

(22) Filed: Aug. 7, 2019

(65) Prior Publication Data

US 2020/0311872 A1 Oct. 1, 2020

(30) Foreign Application Priority Data

Mar. 25, 2019 (KR) .................... 10-2019-0033369

(51) Int. Cl.
| | |
|---|---|
| *G06T 3/40* | (2006.01) |
| *G09G 5/14* | (2006.01) |
| *G01C 21/36* | (2006.01) |
| *B60R 1/00* | (2006.01) |

(52) U.S. Cl.
CPC .............. *G06T 3/4092* (2013.01); *B60R 1/00* (2013.01); *G01C 21/3647* (2013.01); *G09G 5/14* (2013.01); *B60R 2300/302* (2013.01); *B60R 2300/306* (2013.01); *G09G 2340/0407* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 2007/0297692 A1* | 12/2007 | Hamatani | .............. | G09G 3/003 382/282 |
| 2014/0245209 A1* | 8/2014 | Wang | .................... | G06F 3/0481 715/771 |
| 2015/0145995 A1* | 5/2015 | Shahraray | ............... | H04L 67/12 348/148 |

(Continued)

FOREIGN PATENT DOCUMENTS

| | | | |
|---|---|---|---|
| KR | 2009-0116205 A | 11/2009 | |
| WO | WO2018201229 A1 * | 11/2018 | ............. G01C 25/00 |

*Primary Examiner* — James A Thompson
(74) *Attorney, Agent, or Firm* — Mintz Levin Cohn Ferris Glovsky and Popeo, P.C.; Peter F. Corless

(57) ABSTRACT

A vehicular navigation apparatus may include: an input unit configured to receive an image; a display unit configured to display at least one of a navigation image and an input image; and a controller configured to receive the image from the input unit and to control operation of the display unit. Upon receiving the image from the input unit, the controller may be configured to extract a resolution of the input image and to determine whether the resolution of the input image is less than or equal to a reference resolution, and when the resolution of the input image is less than or equal to the reference resolution, the controller may be configured to control the operation of the display unit so as to simultaneously display the navigation image and the input image.

21 Claims, 3 Drawing Sheets

(56) References Cited

U.S. PATENT DOCUMENTS

| | | | |
|---|---|---|---|
| 2015/0211878 A1* | 7/2015 | Jiyama | G01C 21/3632 |
| | | | 701/439 |
| 2015/0261785 A1* | 9/2015 | Ma | G09G 5/377 |
| | | | 345/629 |
| 2016/0094882 A1* | 3/2016 | Jeon | H04N 21/4858 |
| | | | 725/140 |
| 2016/0169701 A1* | 6/2016 | Yang | G01C 21/3676 |
| | | | 701/412 |

* cited by examiner

100

VEHICULAR NAVIGATION APPARATUS, METHOD OF DISPLAYING IMAGE THEREOF, AND VEHICLE INCLUDING VEHICULAR NAVIGATION APPARATUS

CROSS-REFERENCE TO RELATED APPLICATION

This application claims the benefit of priority to Korean Patent Application No. 10-2019-0033369, filed on Mar. 25, 2019, which is hereby incorporated by reference as if fully set forth herein.

BACKGROUND OF THE DISCLOSURE

Field of the Disclosure

The present disclosure relates to a vehicular navigation apparatus, and more particularly, to a vehicular navigation apparatus, a method of displaying an image thereof, and a vehicle including the vehicular navigation apparatus for simultaneously displaying a navigation image and an external input image in consideration of image resolution.

Discussion of the Related Art

In general, a navigation system that is installed in a vehicle may provide route guidance to a desired destination in real-time for a driver. A navigation device establishes a large amount of map information and road information in the form of a searchable database (DB), includes a global positioning system (GPS) module to recognize a current position via communication with a satellite, and matches the recognized current position with the map information and the road information.

In accordance with recent trends, a display screen size of the navigation device has gradually increased for convenience of a driver. Such a navigation device converts map information and road information into an image and displays the image on a display screen similar to the actual environment, and also reproduces a video image input from the outside to provide various convenient characteristics.

However, when a navigation image is displayed on the display screen, e.g., upon receiving a request for reproduction of an external input image, a navigation device stops displaying the currently reproduced navigation image and reproduces the external input image on the display screen. Inconveniently, a driver may be unable to view the navigation image since the navigation device provides only one of the navigation image and the external input image.

Accordingly, there is a need to develop a vehicular navigation device capable of simultaneously displaying a navigation image and an external input image in consideration of image resolution.

SUMMARY OF THE DISCLOSURE

Accordingly, the present disclosure is directed to a vehicular navigation apparatus, a method of displaying an image thereof, and a vehicle including the vehicular navigation apparatus that substantially obviates one or more problems due to limitations and disadvantages of the related art.

An object of the present disclosure is to provide a vehicular navigation apparatus, a method of displaying an image thereof, and a vehicle including the vehicular navigation apparatus for adjusting the size of an image based on the resolution of an input image in order to simultaneously display a navigation image and the input image, thereby enhancing driver convenience.

Another object of the present disclosure is to provide a vehicular navigation apparatus, a method of displaying an image thereof, and a vehicle including the vehicular navigation apparatus by which only a navigation image is displayed without reproducing an input image when the resolution of the input image is less than or equal to a minimum threshold resolution and, thus, driver safety is ensured by preventing the driver from being distracted.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with embodiments of the disclosure, a vehicular navigation apparatus may include: an input unit configured to receive an image; a display unit configured to display at least one of a navigation image and an input image; and a controller configured to receive the image from the input unit and to control operation of the display unit. Upon receiving the image from the input unit, the controller may be configured to extract a resolution of the input image and to determine whether the resolution of the input image is less than or equal to a reference resolution, and when the resolution of the input image is less than or equal to the reference resolution, the controller may be configured to control the operation of the display unit so as to simultaneously display the navigation image and the input image.

When determining whether the extracted resolution of the input image is less than or equal to the reference resolution, the controller may adjust an image size of the input image and an image size of the navigation image and control operation of the display unit so as to simultaneously display the navigation image and the input image when the resolution of the input image is less than or equal to the reference resolution.

When determining whether the extracted resolution of the input image is less than or equal to the reference resolution, the controller may determine whether a vehicle is currently driven when the resolution of the input image is less than or equal to the reference resolution, determine whether the resolution of the input image is less than or equal to a minimum threshold resolution when the vehicle is currently driven, and control the operation of the display unit so as not to reproduce the input image when the resolution of the input image is less than or equal to the minimum threshold resolution.

Furthermore, according to embodiments of the present disclosure, a method of displaying an image using a vehicular navigation apparatus input image may include: receiving, by a controller, an input image; extracting, by the controller, a resolution of the input image; determining, by the controller, whether the resolution of the input image is less than or equal to a reference resolution; and when the resolution of the input image is less than or equal to the reference resolution, controlling, by the controller, operation of a display unit so as to simultaneously display the navigation image and the input image.

Furthermore, according to embodiments of the present disclosure, a non-transitory computer readable recording medium may have recorded thereon a program for executing operations of the method of displaying the vehicular navigation apparatus.

Furthermore, according to embodiments of the present disclosure, a vehicle may include: a communication device configured to receive current position information of the vehicle, and a navigation apparatus configured to display a navigation image including the current position information of the vehicle, wherein the navigation apparatus extracts a resolution of an input image upon receiving the input image, determines whether the extracted resolution of the input image is less than or equal to a reference resolution, and simultaneously displays the navigation image and the input image when the resolution of the input image is less than or equal to the reference resolution.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Figure 1:
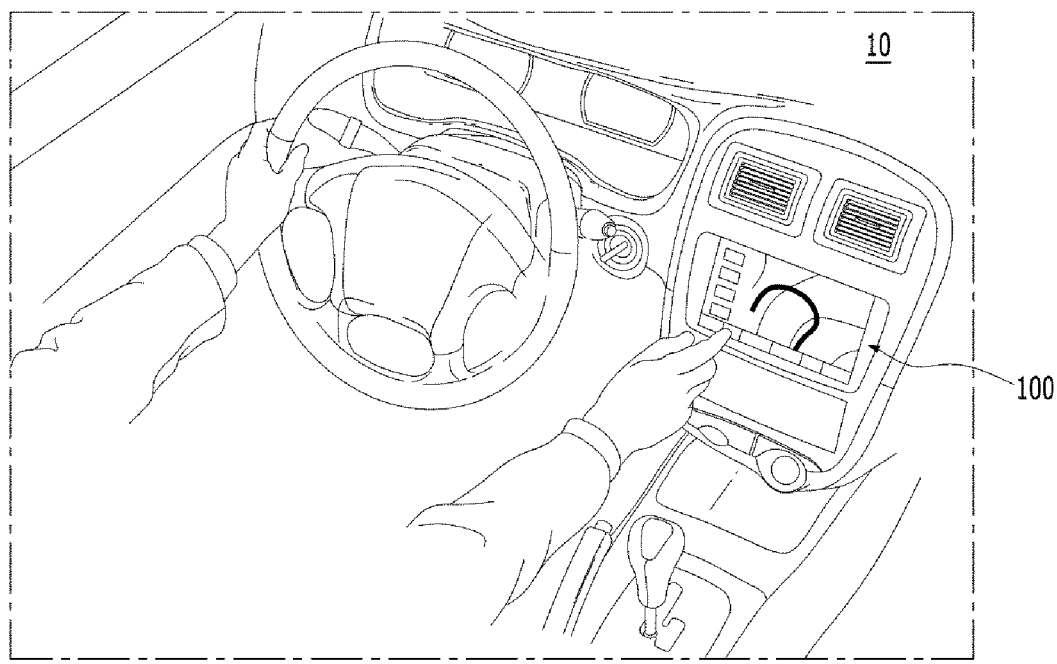
FIG. 1 is a diagram showing a vehicle including a vehicular navigation apparatus according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Exemplary embodiments of the present disclosure are described in detail so as for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers will be used throughout the drawings to refer to the same parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a vehicular navigation apparatus, a method of displaying an image thereof, and a vehicle including the vehicular navigation apparatus, applicable to embodiments of the present disclosure, are described in detail with reference to FIGS. 1 to 5.

FIG. 1 is a diagram showing a vehicle including a vehicular navigation apparatus according to embodiments of the present disclosure.

As shown in FIG. 1, a vehicle 10 may include a communication device for receiving current position information of the vehicle 10 and a navigation apparatus 100 for displaying a navigation image including current position information of the vehicle 10.

Here, upon receiving an input image, the navigation apparatus 100 may extract the resolution of the input image and may determine whether the extracted resolution of the input image is less than or equal to a reference resolution, and may simultaneously display the navigation image and the input image when the resolution of the input image is less than or equal to the reference resolution.

For example, when a universal serial bus (USB) containing a video is inserted into the navigation apparatus 100 according to the present disclosure, the navigation apparatus 100 may determine the resolution of the video image, and may automatically reproduce the video image along with the navigation image upon determining that the resolution of the video image is appropriate.

That is, when the navigation apparatus 100 according to the present disclosure includes a large screen display having a resolution of about 1920*720, upon receiving an image having a resolution of about 1280*720 while the navigation apparatus 100 displays the navigation image on the whole part of the large screen display, the navigation apparatus 100 may automatically adjust the size of the navigation image to have a resolution of about 640*720 and may simultaneously reproduce an image having a resolution of about 1280*720.

Figure 2:
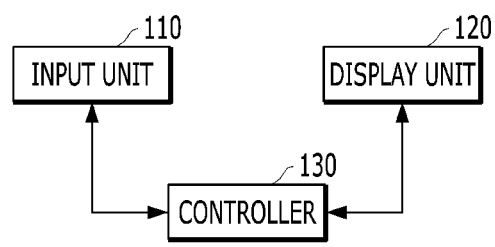
FIG. 2 is a block diagram for explanation of the configuration of a vehicular navigation apparatus according to embodiments of the present disclosure.

FIG. 2 is a block diagram for explanation of the configuration of a vehicular navigation apparatus according to embodiments of the present disclosure.

As shown in FIG. 2, the navigation apparatus 100 according to the present disclosure may include an input unit 110 to which an image is input, a display unit 120 for displaying at least one of a navigation image and the input image, and a controller 130 for controlling the display unit 120.

Here, upon receiving an image from the input unit 110, the controller 130 may extract the resolution of the input image, may determine whether the extracted resolution of the input image is less than or equal to a reference resolution, and may control the display unit 120 to simultaneously display the navigation image and the input image when the resolution of the input image is less than or equal to the reference resolution.

With regard to extraction of the resolution of the input image, upon receiving an image from the input unit 110, the controller 130 may determine whether the navigation image is displayed on a screen of the display unit 120, and may extract the resolution of the input image when the navigation image is displayed on the screen of the display unit 120.

Here, when determining whether the navigation image is displayed, the controller 130 may control the display unit 120 to reproduce only the input image when the navigation image is not displayed on the screen of the display unit 120.

When extracting the resolution of the input image, the controller 130 may extract the screen resolution of the display unit 120 and the resolution of the navigation image and may calculate a reference resolution based on the extracted screen resolution of the display unit 120 and the resolution of the navigation image.

Here, the reference resolution may be calculated according to the equation "reference resolution=screen resolution of display unit−resolution of navigation image".

In this case, the resolution of the navigation image may be lower than the screen resolution of the display unit 120.

For example, the screen resolution of the display unit 120 may be a resolution of about 1920*720 and the resolution of the navigation image may be about 640*720 but, the present disclosure is not limited thereto.

Then, when extracting the resolution of the input image, the controller 130 may determine a position for storing the input image, may separate reproduction information of the input image from the determined position for storing the input image, and may extract the resolution of the input image from the separated reproduction information.

With regard to determining whether the extracted resolution of the input image is less than or equal to the reference resolution, the controller 130 may adjust the image size of the input image and the image size of the navigation image and may control the display unit 120 to simultaneously display the navigation image and the input image when the resolution of the input image is less than or equal to the reference resolution.

That is, with regard to adjustment of the image size of the input image and the image size of the navigation image, the controller 130 may adjust the image size of the navigation image according to the resolution of the navigation image and may adjust the image size of the input image to correspond to the remaining screen size, obtained by excluding the image size of the navigation image from the entire screen size of the display unit 120.

Here, the resolution of the navigation image may be lower than the screen resolution of the display unit 120.

As necessary, when determining whether the extracted resolution of the input image is less than or equal to the reference resolution, the controller 130 may determine whether a vehicle is currently driven when the resolution of the input image is less than or equal to the reference resolution, may determine whether the resolution of the input image is less than or equal to the minimum threshold resolution when the vehicle is currently driven, and may control the display unit 120 not to reproduce the input image when the resolution of the input image is less than or equal to the minimum threshold resolution.

Here, the minimum threshold resolution may be calculated according to the equation "minimum threshold resolution=(screen resolution of display unit−resolution of navigation image)/2".

When determining whether the resolution of the input image is less than or equal to the minimum threshold resolution, the controller 130 may control the display unit 120 to simultaneously display the navigation image and the input image when the resolution of the input image is not less than or equal to the minimum threshold resolution.

When determining whether the vehicle is currently driven, the controller 130 may control the display unit 120 to display a message indicating whether to reproduce an image when the vehicle is not currently driven.

For example, the message indicating whether to reproduce the input image may be a notification message such as "Do you still want to reproduce the image?", but is not limited thereto.

Then, the controller 130 may receive user input corresponding to the message indicating whether to reproduce an image and, when the received user input indicates a request for reproduction of the input image, the controller 130 may adjust the image size of the input image corresponding to the resolution of the input image and the image size of the navigation image and may control the display unit 120 to simultaneously display the navigation image and the input image.

Here, when adjusting the image size of the input image and the image size of the navigation image, the controller 130 may adjust the image size of the navigation image according to the resolution of the navigation image and may adjust the image size of the input image according to the resolution of the input image.

As necessary, when adjusting the image size of the input image and the image size of the navigation image, the controller 130 may adjust the image size of the navigation image according to the resolution of the navigation image and may also adjust the image size of the input image to correspond to the remaining screen size, obtained by excluding the image size of the navigation image from the entire screen size of the display unit.

In another case, when adjusting the image size of the input image and the image size of the navigation image, the controller 130 may adjust the image size of the input image according to the resolution of the input image and may also adjust the image size of the navigation image to correspond to the remaining screen size, obtained by excluding the image size of the input image from the entire screen size of the display unit.

Here, when the image size of the input image according to the resolution of the input image is greater than the entire screen size of the display unit, the controller 130 may reproduce the input image without the navigation image on the entire screen of the display unit.

The controller 130 may receive the user input corresponding to the message indicating whether to reproduce an image and, when the received user input indicates rejection of reproduction of the input image, the controller 130 may control the display unit 120 to display only the navigation image.

When determining whether the extracted resolution of the input image is less than or equal to the reference resolution, the controller 130 may control the display unit 120 to display the message indicating whether to reproduce an image when the resolution of the input image is not less than or equal to the reference resolution.

Here, the controller 130 may receive user input corresponding to the message indicating whether to reproduce an image and, when the received user input indicates a request for reproduction of the input image, the controller 130 may adjust the image size of the input image corresponding to the resolution of the input image and the image size of the navigation image and may control the display unit 120 to simultaneously display the navigation image and the input image.

For example, when adjusting the image size of the input image and the image size of the navigation image, the controller 130 may adjust the image size of the navigation image according to the resolution of the navigation image, and may also adjust the image size of the input image to correspond to the remaining screen size, obtained by excluding the image size of the navigation image from the entire screen size of the display unit.

In addition, the controller 130 may receive the user input corresponding to the message indicating whether to reproduce an image and, when the received user input indicates rejection of reproduction of the input image, the controller 130 may control the display unit 120 to display only the navigation image.

As such, according to embodiments of the present disclosure, the image size of an image may be adjusted based on the resolution of the input image and the navigation image and the input image may be simultaneously displayed, thereby providing driver convenience.

In addition, according to embodiments of the present disclosure, when the resolution of the input image is less than or equal to the minimum threshold resolution, only the navigation image may be displayed without reproducing the input image and, thus, driver safety may be ensured by preventing the driver from being distracted.

Figure 3:
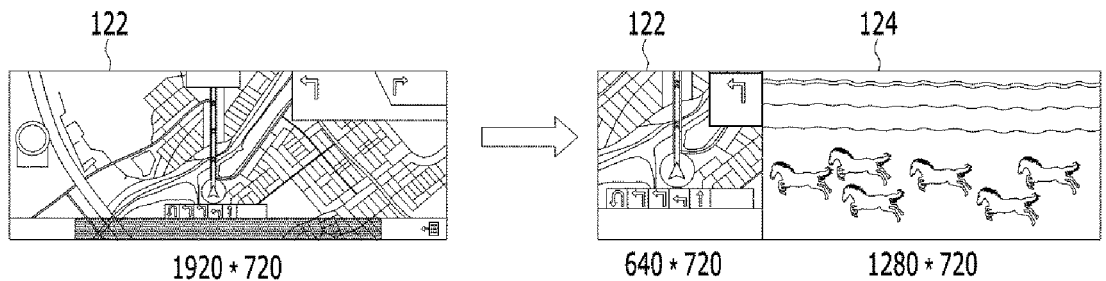
FIG. 3 is a diagram for explanation of a vehicular navigation apparatus for simultaneously displaying a navigation image and an input image.

FIG. 3 is a diagram for explanation of a vehicular navigation apparatus for simultaneously displaying a navigation image and an input image.

As shown in FIG. 3, according to embodiments of the present disclosure, when a navigation image 122 is displayed on an entirety of a display screen and an input image 124 is received, the resolution of the input image 124 may be extracted, whether the extracted resolution of the input image 124 is less than or equal to a reference resolution may be determined and, when the resolution of the input image 124 is less than or equal to the reference resolution, the image size of the navigation image 122 and the image size of the input image 124 may be adjusted and the navigation image 122 and the input image 124 may be simultaneously displayed.

For example, when a display unit of a navigation apparatus is a large screen display having a resolution of about 1920*720, the navigation apparatus may display the navigation image 122 on the entirety of a screen of the display unit.

Upon receiving the input image 124 having a resolution of about 1280*720, the navigation apparatus may determine whether the input image 124 having a resolution of about 1280*720 is less than or equal to a reference resolution (screen resolution of display unit−resolution of navigation image).

Here, when the screen resolution of the display unit is about 1920*720 and the resolution of the navigation image is about 640*720, the reference resolution may be about 1280*720.

Accordingly, when the input image 124 has a resolution less than or equal to the reference resolution, the navigation apparatus may automatically adjust the image size of the navigation image 122 to have a resolution of about 640*720, and may together reproduce the navigation image 122 having a resolution of about 640*720 and the input image 124 having a resolution of about 1280*720.

Figure 4:
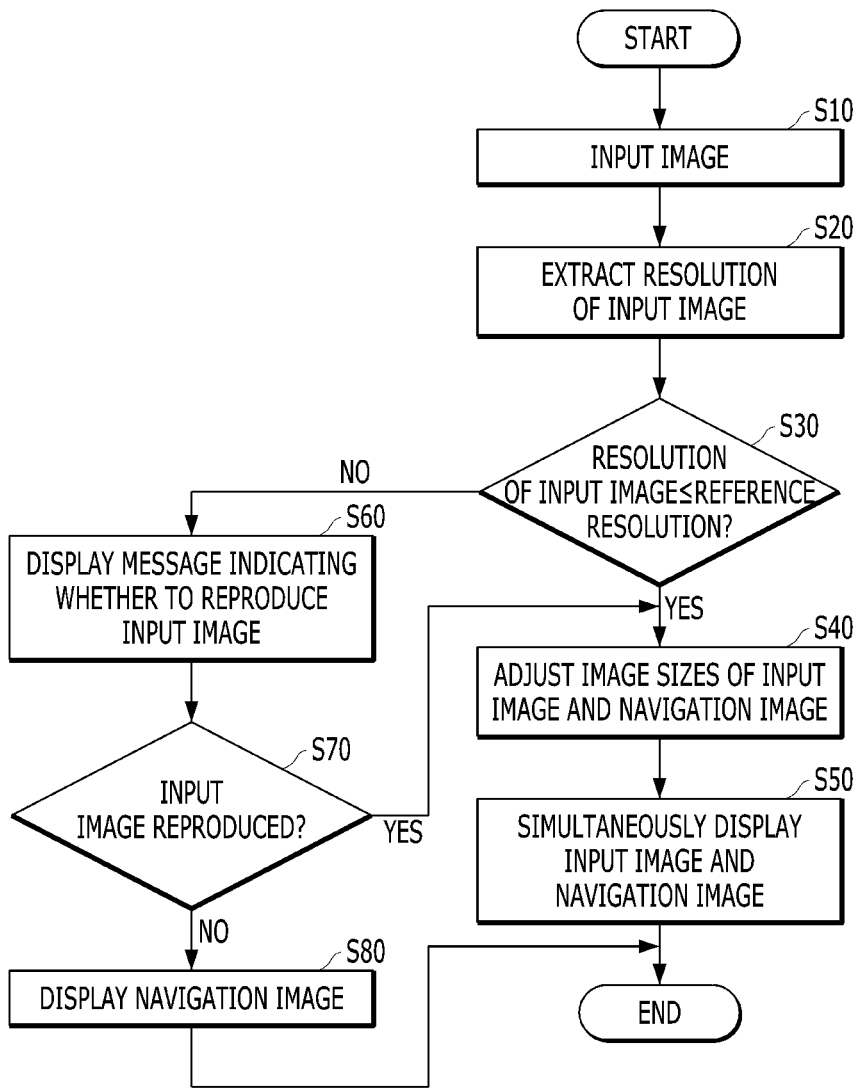
FIG. 4 is a flowchart for explanation of a method of displaying an image of a vehicular navigation apparatus according to embodiments of the present disclosure.

FIG. 4 is a flowchart for explanation of a method of displaying an image of a vehicular navigation apparatus according to embodiments of the present disclosure.

As shown in FIG. 4, the navigation apparatus according to embodiments of the present disclosure may receive an input image from the outside through an input unit (S10).

The navigation apparatus may extract a resolution of the input image (S20).

When extracting the resolution of the input image, the navigation apparatus may determine whether a navigation image is displayed on a screen of a display unit and, when the navigation image is displayed on the screen of the display unit, the navigation apparatus may extract the resolution of the input image.

In this case, when the navigation apparatus determines whether the navigation image is displayed, if the navigation image is not displayed on the screen of the display unit, the navigation apparatus may reproduce only the input image.

When extracting the resolution of the input image, the navigation apparatus may extract the screen resolution of the display unit and the resolution of the navigation image and may also calculate a reference resolution based on the extracted screen resolution of the display unit and the resolution of the navigation image.

For example, the reference resolution may be calculated according to the equation "reference resolution=screen resolution of display unit−resolution of navigation image".

Here, the resolution of the navigation image may be lower than the screen resolution of the display unit.

When extracting the resolution of the input image, the navigation apparatus may determine a position for storing the input image, may separate reproduction information of the input image from the determined position for storing the input image, and may extract the resolution of the input image from the separated reproduction information.

Then, the navigation apparatus may determine whether the extracted resolution of the input image is less than or equal to the reference resolution (S30).

Then, when the resolution of the input image is less than or equal to the reference resolution, the navigation apparatus may adjust the image size of the input image and the image size of the navigation image (S40).

Here, when adjusting the image size of the input image and the image size of the navigation image, the navigation apparatus may adjust the image size of the navigation image according to the resolution of the navigation image and may adjust the image size of the input image to correspond to the remaining screen size, obtained by excluding the image size of the navigation image from the entire screen size of the display unit.

For example, the resolution of the navigation image may be lower than the screen resolution of the display unit.

The navigation apparatus may simultaneously display the navigation image and the input image based on the adjusted image sizes (S50).

In operation S30 of determining whether the extracted resolution of the input image is less than or equal to the reference resolution, when the resolution of the input image is not less than or equal to the reference resolution, the navigation apparatus may display the message indicating whether to reproduce the input image (S60).

Then, the navigation apparatus may determine whether user input corresponding to the message indicating whether to reproduce an image is received and may determine whether the received user input indicates a request for reproduction of the input image (S70).

Then, when the received user input is a request for reproduction of the input image, the navigation apparatus may perform operation S40 of adjusting the image size of the input image in consideration of the resolution of the input image and the image size of the navigation image and operation S50 of simultaneously displaying the navigation image and the input image with the adjusted image sizes.

Here, when adjusting the image size of the input image and the image size of the navigation image, the navigation apparatus may adjust the image size of the navigation image according to the resolution of the navigation image and may adjust the image size of the input image to correspond to the remaining screen size, obtained by excluding the image size of the navigation image from the entire screen size of the display unit.

In another case, when adjusting the image size of the input image and the image size of the navigation image, the navigation apparatus may adjust the image size of the input image according to the resolution of the input image and may also adjust the image size of the navigation image to correspond to the remaining screen size, obtained by excluding the image size of the input image from the entire screen size of the display unit.

Here, when the image size of the input image according to the resolution of the input image is greater than the entire screen size of the display unit, the navigation apparatus may reproduce the input image without the navigation image on the entire screen of the display unit.

The navigation apparatus may display only the navigation image when the received user input indicates rejection of reproduction of the input image instead of a request for reproduction of the input image (S80).

As such, according to embodiments of the present disclosure, the image size of an image may be adjusted based on the resolution of the input image and the navigation image and the input image may be simultaneously displayed, thereby providing driver convenience.

Figure 5:
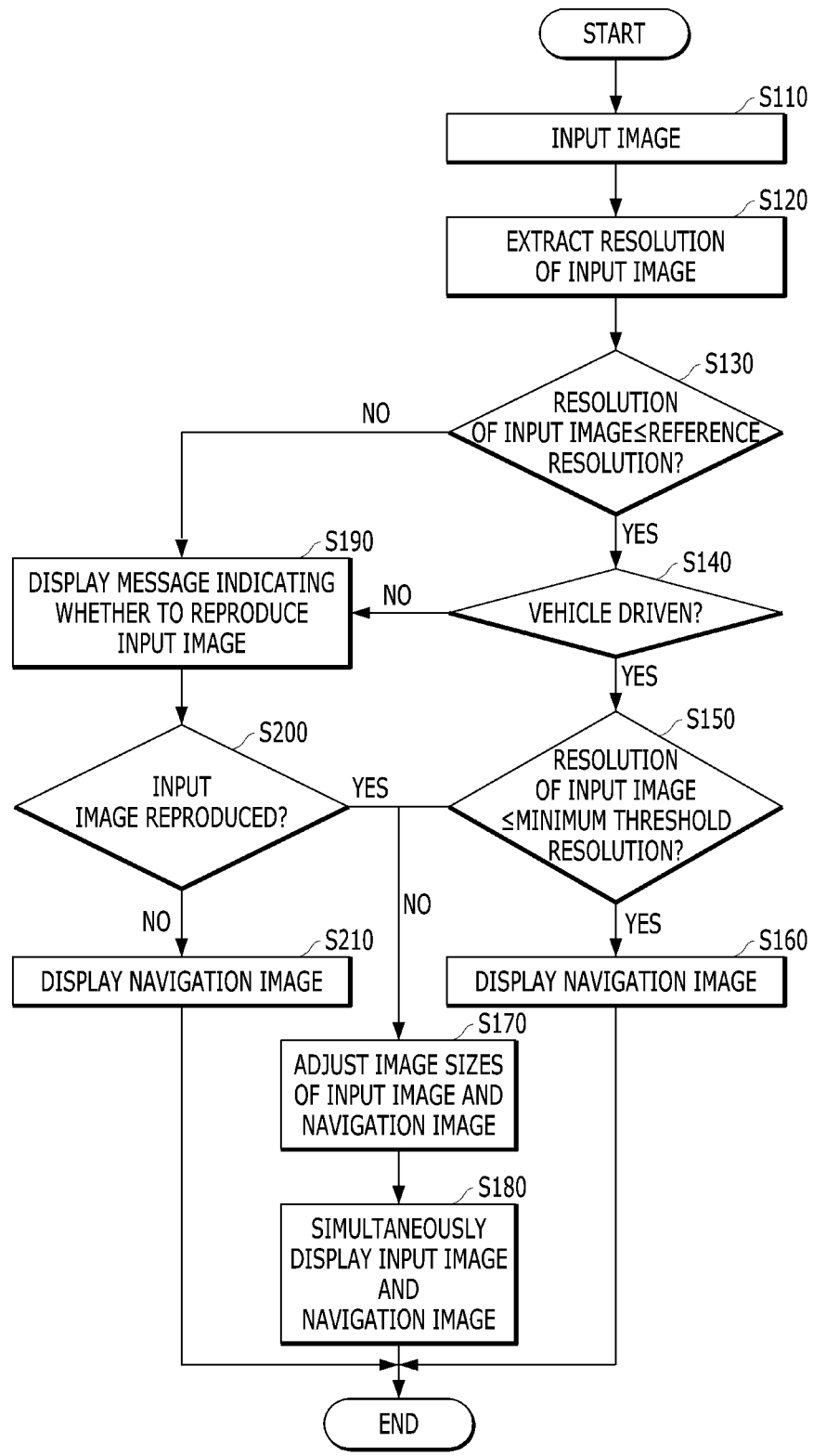
FIG. 5 is a flowchart for explanation of another method of displaying an image of a vehicular navigation apparatus according to embodiments of the present disclosure.

FIG. 5 is a flowchart for explanation of another method of displaying an image of a vehicular navigation apparatus according to embodiments of the present disclosure.

As shown in FIG. 5, the navigation apparatus according to embodiments of the present disclosure may receive an input image from the outside through an input unit (S110).

The navigation apparatus may extract a resolution of the input image (S120).

Here, when extracting the resolution of the input image, the navigation apparatus may determine whether the navigation image is displayed on a screen of a display unit and, when the navigation image is displayed on the screen of the display unit, the navigation apparatus may extract the resolution of the input image.

In this case, when the navigation apparatus determines whether the navigation image is displayed, if the navigation image is not displayed on the screen of the display unit, the navigation apparatus may reproduce only the input image.

When extracting the resolution of the input image, the navigation apparatus may extract the screen resolution of the display unit and the resolution of the navigation image and may also calculate a reference resolution based on the extracted screen resolution of the display unit and the resolution of the navigation image.

For example, the reference resolution may be calculated according to the equation "reference resolution=screen resolution of display unit−resolution of navigation image".

Here, the resolution of the navigation image may be lower than the screen resolution of the display unit.

When extracting the resolution of the input image, the navigation apparatus may determine a position for storing the input image, may separate reproduction information of the input image from the determined position for storing the input image, and may extract the resolution of the input image from the separated reproduction information.

Then, the navigation apparatus may determine whether the extracted resolution of the input image is less than or equal to the reference resolution (S130).

In addition, when the resolution of the input image is less than or equal to the reference resolution, the navigation apparatus may determine whether the vehicle is currently driven (S140).

Then, when the vehicle is currently driven, the navigation apparatus may determine whether the resolution of the input image is less than or equal to the minimum threshold resolution (S150).

Here, the minimum threshold resolution may be calculated according to the equation "minimum threshold resolution=(screen resolution of display unit−resolution of navigation image)/2".

When the resolution of the input image is less than or equal to the minimum threshold resolution, the navigation apparatus may not reproduce the input image (S160).

When the resolution of the input image is not less than or equal to the minimum threshold resolution, the navigation apparatus may adjust the image size of the input image and the image size of the navigation image (S170).

Here, when adjusting the image size of the input image and the image size of the navigation image, the navigation apparatus may adjust the image size of the navigation image according to the resolution of the navigation image and may adjust the image size of the input image to correspond to the remaining screen size, obtained by excluding the image size of the navigation image from the entire screen size of the display unit.

For example, the resolution of the navigation image may be lower than the resolution of the display unit.

The navigation apparatus may simultaneously display the navigation image and the input image based on the adjusted image sizes (S180).

In operation S130 of determining whether the extracted resolution of the input image is less than or equal to the reference resolution, when the resolution of the input image is not less than or equal to the reference resolution, the navigation apparatus may display the message indicating whether to reproduce the input image (S190).

Then, the navigation apparatus may determine whether user input corresponding to the message indicating whether to reproduce an image is received and may determine whether the received user input indicates a request for reproduction of the input image (S200).

Then, when the received user input indicates a request for reproduction of the input image, the navigation apparatus may perform operation S170 of adjusting the image size of the input image according to the resolution of the input image and the image size of the navigation image and operation S180 of simultaneously displaying the navigation image and the input image with the adjusted image sizes.

Here, when adjusting the image size of the input image and the image size of the navigation image, the navigation apparatus may adjust the image size of the navigation image according to the resolution of the navigation image and may adjust the image size of the input image to correspond to the remaining screen size, obtained by excluding the image size of the navigation image from the entire screen size of the display unit.

In another case, when adjusting the image size of the input image and the image size of the navigation image, the navigation apparatus may adjust the image size of the input image in consideration of the resolution of the input image and may also adjust the image size of the navigation image to correspond to the remaining screen size, obtained by excluding the image size of the input image from the entire screen size of the display unit.

Here, when the image size of the input image according to the resolution of the input image is greater than the entire screen size of the display unit, the navigation apparatus may reproduce the input image without the navigation image on the entire screen of the display unit.

The navigation apparatus may display only the navigation image when the received user input indicates the image size of reproduction of the input image instead of a request for reproduction of the input image (S210).

In operation S140 of determining whether the vehicle is currently driven, when the vehicle is not currently driven, the navigation apparatus may sequentially perform operation S190 of displaying the message indicating whether to reproduce the input image and subsequent operations S200, S210, S170, and S180.

As such, according to embodiments of the present disclosure, when the resolution of the input image is less than or equal to the minimum threshold resolution, only the navigation image may be displayed without reproducing the input image and, thus, driver safety may be provided by preventing the driver from being distracted.

According to embodiments of the present disclosure, a non-transitory computer readable recording medium having recorded thereon a program for executing a method of displaying an image of a vehicular navigation apparatus may perform operations provided in the method of displaying an image of a vehicular navigation apparatus according to embodiments of the present disclosure.

A vehicle according to embodiments of the present disclosure may include a communication device for receiving current position information of the vehicle, and a navigation apparatus for displaying a navigation image including the current position information of the vehicle and, in this case, upon receiving an input image, the navigation apparatus may extract the resolution of an input image and may determine whether the extracted resolution of the input image is less than or equal to the reference resolution and, when the resolution of the input image is less than or equal to the reference resolution, the navigation apparatus may simultaneously display the navigation image and the input image.

As such, according to embodiments of the present disclosure, the image size of an image may be adjusted based on the resolution of the input image and the navigation image and the input image may be simultaneously displayed, thereby providing driver convenience.

In addition, according to embodiments of the present disclosure, when the resolution of the input image is less than or equal to the minimum threshold resolution, only the navigation image may be displayed without reproducing the input image and, thus, driver safety may be ensured by preventing the driver from being distracted.

The vehicular navigation apparatus configured as described above, the method of displaying an image thereof, and the vehicle including the vehicular navigation apparatus according to at least one embodiment of the present disclosure may adjust an image size of an image based on the resolution of the input image and may simultaneously display the navigation image and the input image, thereby providing driver convenience.

According to embodiments of the present disclosure, when the resolution of the input image is less than or equal to the minimum threshold resolution, only the navigation image may be displayed without reproducing the input image, whereby driver safety may be ensured by preventing the driver from being distracted.

For example, according to embodiments of the present disclosure, when a driver inserts a USB containing a video image into the navigation apparatus, if the navigation apparatus determines that the video image is appropriate for a large screen display, the navigation apparatus may determine the appropriate image and may simultaneously provide a navigation image appropriate for a large screen navigation apparatus and the video image.

It will be appreciated by persons skilled in the art that that the effects that could be achieved with the present disclosure are not limited to what has been particularly described hereinabove and other advantages of the present disclosure will be more clearly understood from the detailed description.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A vehicular navigation apparatus comprising:
an input unit configured to receive an image;
a display unit configured to display at least one of a navigation image and an input image; and
a controller configured to receive the image from the input unit and to control operation of the display unit, wherein
upon receiving the image from the input unit, the controller is configured to extract a resolution of the input image and to determine whether the resolution of the input image is less than or equal to a reference resolution, and when the resolution of the input image is less than or equal to the reference resolution, the controller is configured to control the operation of the display unit so as to simultaneously display the navigation image and the input image,
wherein the navigation image and the input image each capture different features.

2. The vehicular navigation apparatus of claim 1, wherein the controller is configured to extract a screen resolution of the display unit and a resolution of the navigation image and to calculate the reference resolution based on the screen resolution of the display unit and the resolution of the navigation image.

3. The vehicular navigation apparatus of claim 2, wherein the reference resolution is calculated according to an equation as follows: the reference resolution=the screen resolution of the display unit−the resolution of the navigation image.

4. The vehicular navigation apparatus of claim 1, wherein the controller is configured to adjust an image size of the input image and an image size of the navigation image and to control operation of the display unit so as to simultaneously display the navigation image and the input image when the resolution of the input image is less than or equal to the reference resolution.

5. The vehicular navigation apparatus of claim 4, wherein the controller is configured to adjust the image size of the navigation image according to the resolution of the navigation image and to adjust the image size of the input so as to correspond to a remaining screen size that is obtained by excluding the image size of the navigation image from an entire screen size of the display unit.

6. The vehicular navigation apparatus of claim 1, wherein the controller is configured to determine whether a vehicle is currently driven when the resolution of the input image is less than or equal to the reference resolution, to determine whether the resolution of the input image is less than or equal to a minimum threshold resolution when the vehicle is currently driven, and to control the operation of the display unit so as not to reproduce the input image when the resolution of the input image is less than or equal to the minimum threshold resolution.

7. The vehicular navigation apparatus of claim 6, wherein the minimum threshold resolution is calculated according to an equation as follows: the minimum threshold resolution=(a screen resolution of the display unit−a resolution of the navigation image)/2.

8. The vehicular navigation apparatus of claim 6, wherein the controller is configured to control the operation of the display unit so as to display a message indicating whether to reproduce an image when the vehicle is not currently driven.

9. The vehicular navigation apparatus of claim 8, wherein the controller is configured to receive user input corresponding to the message indicating whether to reproduce the image and, when the received user input indicates a request for reproduction of the input image, the controller is configured to adjust the image size of the input image corresponding to the resolution of the input image and the image size of the navigation image and to control the operation of the display unit so as to simultaneously display the navigation image and the input image.

10. The vehicular navigation apparatus of claim 8, wherein the controller is configured to receive user input corresponding to the message indicating whether to reproduce the image and to control the operation of the display unit so as to display only the navigation image when the received user input indicates a rejection of reproduction of the input image.

11. The vehicular navigation apparatus of claim 1, wherein the controller is configured to control the operation of the display unit so as to display a message indicating whether to reproduce an image when the resolution of the input image is not less than or equal to the reference resolution.

12. The vehicular navigation apparatus of claim 11, wherein the controller is configured to receive user input corresponding to the message indicating whether to reproduce the image and, when the received user input indicates a request for reproduction of the input image, the controller is configured to adjust the image size of the input image so as to correspond to the resolution of the input image and the image size of the navigation image and to control the operation of the display unit so as to simultaneously display the navigation image and the input image.

13. The vehicular navigation apparatus of claim 12, wherein the controller is configured to adjust the image size of the input image according to the resolution of the input image and to adjust the image size of the navigation image so as to correspond to a remaining screen size that is obtained by excluding the image size of the input image from an entire screen size of the display unit.

14. The vehicular navigation apparatus of claim 13, wherein, when the image size of the input image is greater than the entire screen size of the display unit, the controller is configured to reproduce the input image without the navigation image on the entire screen of the display unit.

15. The vehicular navigation apparatus of claim 11, wherein the controller is configured to receive user input corresponding to the message indicating whether to reproduce the image and to control the operation of the display unit so as to display only the navigation image when the received user input indicates a rejection of reproduction of the input image.

16. A method of displaying an image using a vehicular navigation apparatus including a display unit configured to display a navigation image, the method comprising:
receiving, by a controller, an input image;
extracting, by the controller, a resolution of the input image;
determining, by the controller, whether the resolution of the input image is less than or equal to a reference resolution; and
when the resolution of the input image is less than or equal to the reference resolution, controlling, by the controller, operation of a display unit so as to simultaneously display the navigation image and the input image,
wherein the navigation image and the input image each capture different features.

17. The method of claim 16, wherein the extracting of the resolution of the input image comprises:
extracting, by the controller, a screen resolution of the display unit and a resolution of the navigation image; and
calculating, by the controller, the reference resolution based on the screen resolution of the display unit and the resolution of the navigation image,
wherein the reference resolution is calculated according to an equation as follows: the reference resolution=the screen resolution of the display unit−the resolution of the navigation image.

18. The method of claim 16, wherein:

the determining of whether the extracted resolution of the input image is less than or equal to the reference resolution comprises:

adjusting, by the controller, an image size of the input image and an image size of the navigation image; and controlling, by the controller, the operation of the display unit so as to simultaneously display the navigation image and the input image when the resolution of the input image is less than or equal to the reference resolution; and the adjusting of the image size of the input image and the image size of the navigation image comprises:

adjusting, by the controller, the image size of the navigation image according to the resolution of the navigation image; and adjusting, by the controller, the image size of the input to correspond to a remaining screen size that is obtained by excluding the image size of the navigation image from an entire screen size of the display unit.

19. The method of claim 16, wherein the determining of whether the extracted resolution of the input image is less than or equal to the reference resolution comprises:

controlling, by the controller, the operation of the display unit so as to display a message indicating whether to reproduce an image wherein the resolution of the input image is not less than or equal to the reference resolution;

receiving, by the controller, user input corresponding to the message indicating whether to reproduce the image;

adjusting, by the controller, the image size of the input image according to the resolution of the input image and the image size of the navigation image when the received user input is a request for reproduction of the input image; and controlling, by the controller, the operation of the display unit so as to simultaneously display the navigation image and the input image with the adjusted image sizes.

20. The method of claim 19, further comprising, after the displaying of the message indicating whether to reproduce the image:

receiving, by the controller, user input corresponding to the message indicating whether to reproduce the image; and controlling, by the controller, the operation of the display unit so as to display only the navigation image when the received user input indicates rejection of reproduction of the input image.

21. The method of claim 16, wherein the determining of whether the resolution of the input image is less than or equal to the reference resolution comprises:

determining, by the controller, whether a vehicle is currently driven when the resolution of the input image is less than or equal to the reference resolution;

determining, by the controller, whether the resolution of the input image is less than or equal to a minimum threshold resolution when the vehicle is currently driven; and controlling, by the controller, the operation of the display unit so as to simultaneously display the navigation image and the input image when the resolution of the input image is not less than or equal to the minimum threshold resolution, and not reproducing the input image when the resolution of the input image is less than or equal to the minimum threshold resolution.

* * * * *